3,133,110
REACTION OF SILYLAMINES WITH HYDROXY-SILICON COMPOUNDS
Edward L. Morehouse and Donald L. Bailey, Snyder, N.Y., assignors to Union Carbide Corporation, a corporation of New York
No Drawing. Filed Apr. 5, 1961, Ser. No. 100,816
11 Claims. (Cl. 260—448.2)

This invention relates to a process for producing organosilicon compounds. More particularly, the invention is directed to a process for producing organosilicon compounds by the reaction of silylamines with hydroxy-silicon compounds.

We have discovered an efficient process for producing a wide variety of organosilicon compounds which comprises the reaction of an N-alkyl substituted silylamine with an organosilicon compound containing at least one silicon-bonded hydroxyl group. This process takes place at moderate temperatures, at relatively high rates of reaction, and with a minimum of undesirable side reactions. An example of our process is the reaction of triphenylsilanol with N,N-diethylaminotrimethylsilane to produce $(C_6H_5)_3SiOSi(CH_3)_3$.

The organosilicon compounds containing silicon-bonded hydroxyl groups that are useful in the process of this invention include those represented by the formula:

(1)
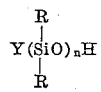

wherein R is a substituted or unsubstituted monovalent hydrocarbon group, Y is an R group or a hydroxyl group and $n$ is an integer having a value of at least one. Illustrative of the unsubstituted monovalent hydrocarbon groups represented by R in Formula 1 are the alkyl groups (e.g., the methyl, ethyl, t-butyl, decyl and octadecyl groups), the cycloalkyl groups (e.g., the cyclohexyl and the cyclopentyl groups), the aryl groups (e.g., the phenyl, tolyl, xylyl and naphthyl groups), the aralkyl groups (e.g., the benzyl and beta-phenylethyl groups), the alkenyl groups (e.g., the vinyl, allyl and hexenyl groups) and the cycloalkenyl groups (e.g., the cyclopentenyl and cyclohexenyl groups). Illustrative of the substituted monovalent hydrocarbon groups represented by R in Formula 1 are the alkyl, cycloalkyl, aryl, aralkyl, alkenyl and cycloalkenyl groups containnig as substituents one or more halogen atoms (e.g., fluorine, chlorine, bromine or iodine atoms) or nitro, cyano or hydrocarbon-oxy (e.g., alkoxy or aryloxy such as ethoxy, butoxy, phenoxy and benzyloxy) groups. These substituents do not take part in side reactions to any significant extent during the process of this invention. The groups represented by R in Formula 1 preferably contain from one to about ten carbon atoms, inclusive of carbon atoms in substituents (such as —CN groups), and the value of $n$ is preferably from 1 to 50. In Formula 1, $n$ can represent an average value in those cases where mixtures of hydroxyl-containing organosilicon compounds are employed.

Typical of the hydroxyl-containing organosilicon compounds represented by Formula 1 are those that are more specifically represented by the formulas:

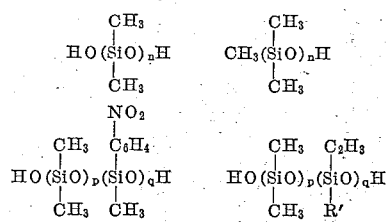

wherein the integers $n$, $p$ and $q$ each have a value of at least one, and R' is a methyl or an ethyl group.

Other operable hydroxy-silicon compounds containing at least one silicon-bonded hydroxy group include polysiloxanes containing three or more silicon-bonded hydroxy groups randomly distributed along the polysiloxane chain and siloxanes containing trifunctional silicon atoms. Such compounds can include both non-end-blocking and end-blocking silicon-bonded hydroxy groups and, in addition, those compounds where the silicon-bonded hydroxy groups occur on silicon atoms along the chain but not on terminal silicon atoms. Operable compounds containing one or more trifunctional silicon atoms are illustrated by the siloxanes $$CH_3Si([OSi(CH_3)_2]_6OH)_3$$

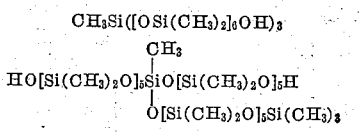

and $[(CH_3SiO_{3/2})(C_6H_5SiO)OH]_x$, where $x$ is an integer.

The hydroxy-silicon compounds useful in the process of this invention, including those represented by Formula 1 above, can be produced by known methods, for example, by the reaction of a cyclic diorganosiloxane with steam at elevated temperature and pressure, or by the hydrolysis or co-hydrolysis of the corresponding chlorosilane or acetoxysilane monomers.

The N-alkyl substituted silylamines that are useful in the process of this invention can be represented by the formula:

(2)

wherein R has the meaning defined hereinabove with reference to Formula 1, G is an alkyl group, G' is hydrogen or an alkyl group, Z is an R group, —NGG,

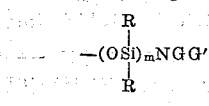

or

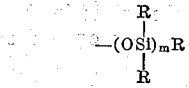

and $m$ is an integer having a value from one to fifty. Illustrative of the alkyl groups which G and G' can represent are the methyl, ethyl, t-butyl, decyl and octadecyl groups. Preferably, the G and G' groups are both alkyl groups containing from one to about ten carbon atoms.

A preferred class of silylamines are those containing only one silicon atom. This preferred class can be represented by the formula (3)    $R_2Si(NGG')_2$ where R, G and G' have the meanings defined above. These silylamines are preferred because they react rapidly with dihydroxy end-blocked polysiloxanes to give high yields of products which contain regularly spaced organic substituents. This preferred embodiment of our invention is decribed in more detail below.

Illustrative of the silylamines represented by Formulas 2 and 3 are: monofunctional silylamines such as diethyl-aminodimethylphenylsilane, n-butylaminomethyldiethyl-silane, dimethylaminodimethyl(gamma - chloropropyl)-silane, t-butylaminotrimethylsilane, ethylaminodimethylcyclohexylsilane and diethylaminotri-n-butylsilane; difunctional silylamines such as bis(diethylamino)dimethylsilane, bis(dimethylamino)diphenylsilane, bis(diethylamino)methyl-beta-cyanoethylsilane, bis(t-butylamino)dimethylsilane and bis(ethylamino)methylallylsilane; and the N-alkylamino end-blocked polysiloxanes $$(CH_3)_3Si[OSi(CH_3)_2]_3NHC_2H_5$$

$$(C_2H_5)_2NSi(CH_3)_2[OSi(CH_3)_2]_{19}N(C_2H_5)_2$$

The silylamines of Formulas 2 and 3 can be prepared by known methods, for example, by the reaction of a chlorosilane or a chlorine end-blocked diorganopolysiloxane with a monoalkyl or dialkyl amine.

The organosilicon compounds which can be prepared by the process of this invention vary broadly depending upon the structure of the starting compounds. Monofunctional silylamines such as diethylaminotrimethylsilane, react to form (a) disiloxanes with monofunctional silanols such as triphenylsilanol, (b) trisiloxanes with difunctional silanediols such as diphenyldisilane-1,5-diol, and (c) end-blocked polysiloxane fluids with hydroxy-end-blocked polysiloxane fluids such as dimethylsiloxane trimerdiol. Difunctional silylamines such as bis(diethylamino)dimethylsilane react to form (a) trisiloxanes with monofunctional silanols such as triethylsilanol, (b) linear and cyclic polymers containing alternating methyl and phenyl substituents attached to silicon with difunctional silanediols such as diphenylsilanediol, and (c) linear siloxane polymers containing methyl substituents regularly spaced along the siloxane chain or cyclic siloxanes having different siloxane units present when the difunctional silylamine is reacted with hydroxy-end-blocked siloxanes such as $HO[Si(C_6H_5)_2O]_2H$. For example, disiloxanes, trisiloxanes, cyclic siloxanes and linear siloxane polymers with substituents regularly spaced along the siloxane chain can be prepared as illustrated by the equations:

$(CH_3)_3SiN(C_2H_5)_2 + (C_6H_5)_3SiOH \longrightarrow$
$\qquad (CH_3)_3SiOSi(C_6H_5)_3 + (C_2H_5)_2NH$ $2(CH_3)_3SiN(C_2H_5)_2 + (C_6H_5)_2Si(OH)_2 \longrightarrow$
$\qquad [(CH_3)_3SiO]_2Si(C_6H_5)_2 + 2(C_2H_5)_2NH$ $(C_6H_5)_2Si[N(C_2H_5)_2]_2 + HO[(CH_3)_2SiO]_3H \xrightarrow{solvent}$
$\qquad cyclo\text{-}[(CH_3)_2SiO]_3[(C_6H_5)_2SiO] + 2(C_2H_5)NH$ $(C_6H_5)_2Si[N(C_2H_5)_2]_2 + HO[(CH_3)_2SiO]_3H \longrightarrow$
$\qquad HO\{[(CH_3)_2SiO]_3[(C_6H_5)_2SiO]\}_xH + (C_2H_5)_2NH$ where $x$ is an integer.

The reaction which takes place in the process of this invention, as illustrated by the equations above, can be represented as follows:

$$\equiv SiOH + GG'NSi \equiv \longrightarrow \equiv SiOSi \equiv + HNGG'$$

That is, the N-alkyl substituted silylamine and the organosilicon compound containing at least one silicon-bonded hydroxyl group react at the oxygen-hydrogen and silicon-nitrogen bonds with the formation of silicon-oxygen-silicon bonds and the elimination, between the ≡SiOH and ≡SiNGG' moieties, of an amine represented by the formula HNGG', where G and G' have the meanings defined above with reference to Formula 2.

Stated otherwise, the process of this invention produces siloxanes which contain at least one unit derived from the hydroxy-silicon compound and at least one unit derived from the silylamine, these units being interconnected by silicon-oxygen-silicon bonds. The units in the product siloxane that are derived from the hydroxy-silicon compounds of Formula 1 above can have the structures

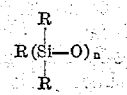

or

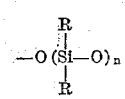

where R and $n$ have the meanings defined above, depending on whether Y is an R group or a hydroxyl group. The units in the product siloxane that are derived from the silylamines of Formula 2 can have the structures

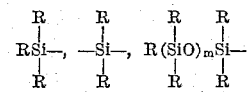

or

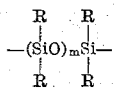

where R and $m$ have the meanings defined above, depending on whether Z is an R group, —NGG',

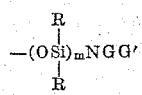

or

The units in the siloxane product which are derived from the preferred class of silylamines of Formula 3 have the formula

The process of this invention is conveniently carried out by mixing the silylamine and hydroxy-containing organosilicon compound in any suitable reaction vessel, and maintaining the mixture at a temperature between about 0° C. and about 200° C. until the silylamine and the organosilicon compound react with the formation of silicon-oxygen-silicon bonds and the elimination of an amine represented by the formula HNGG'. The siloxane product, containing the structural units derived from the hydroxy-silicon compound and silylamine as described above, can then be recovered from the reaction mixture by conventional procedures, for example, by fractional distillation or by allowing a solid reaction product to crystallize out of the final reaction mixture.

At temperatures below 0° C. the reaction proceeds at extremely slow and impractical rates, while at temperatures above about 200° C. undesirable side reactions may take place to a significant degree. One such side reaction is the condensation reaction between two hydroxy-silicon compounds, which reaction is catalyzed at elevated temperatures by the presence of the weakly basic silylamine. The preferred temperature range for the process of this invention is between about 20° C. and about 100° C.

The ratio of the reactants in the process of this invention is not narrowly critical. However, it is preferred to use approximately stoichiometric equivalents of silylamine and hydroxy-silicon compound, the stoichiometry being based upon the reaction of one silicon-bonded hydroxyl group with each N-alkyl substituted amino group. In the reaction of monofunctional N-alkyl substituted silylamines with hydroxy-silicon compounds the use of less than stoichiometric amounts of the silylamine leads to incomplete reaction of the ≡SiOH groups, while an excess of the silylamines leaves unreacted silylamine which must be removed in the separation of the desired reaction product. In the case of the reaction of difunctional N-alkyl substituted silylamines the use of a stoichiometric excess of silylamine leads to side products containing ≡SiNGG' substituents, while an excess of hydroxy-silicon compound gives by-products containing ≡SiOH substituents. Where complete reaction of the N-alkyl substituted silylamine with the hydroxy-silicon compound is desired, or products free of ≡SiOH and ≡SiNGG' substituents are required, stoichiometric quantities of N-alkyl substituted silylamine and hydroxy-silicon compound should be used.

Undersirable side reactions can be kept to a minimum by using silylamines of the type shown in Equations 2 and 3 above where both G and G' are alkyl groups. Such N,N-dialkyl substituted silylamines will not undergo any self-condensation to silazanes and amine, whereas silylamines containing only a single N-alkyl substituent can condense to some extent to give silazanes and amines particularly if a stoichiometric excess of the monoalkyl substituted silylamine is employed.

The use of a solvent for the silylamine and the hydroxy-silicon compound is not essential in the process of this invention. However, it is often desirable to use a solvent, particularly where the silylamine and hydroxy-silicon compound are not mutually soluble. Any solvent which is free from readily replaceable hydrogens (active hydrogens) can be employed in the process of this invention. Thus, suitable solvents include ethers, hydrocarbons, tertiary amines, heterocyclic amines free from active hydrogens, and the like. Solvents which are not suitable in the process of this invention include alcohols, acids, primary amines and secondary amines. The solvents most preferred are aromatic hydrocarbons such as benzene, xylene, cumene, and the like, aliphatic hydrocarbons such as petroleum ether, n-heptane, isooctane, and the like, and ethers such as diethyl ether, dibutyl ether, ethylene glycol dimethyl ether, the dialkyl ethers of polyalkylene glycols such as bis(2-methoxyethyl)ether, dioxane tetrahydrofuran, and the like. The amount of solvent is not critical and can vary from about 10 weight percent to about 90 weight percent of the reaction mixture. When the desired product of the reaction is a cyclic polysiloxane, it is preferred to employ relatively high solvent concentrations. Relatively low solvent concentrations tend to favor the formation of linear polysiloxanes.

The time over which the reaction mixture is maintained within the range of reaction temperatures depends upon the particular silylamine and hydroxy-silicon compound employed. In general, reaction times can vary from as little as fifteen minutes to as much as one hundred hours or longer. Since the reaction takes place smoothly and at a measurable rate, the amount of the desired product increases with time. Therefore, product can be recovered from the reaction mixture at any time by subjecting the reaction mixture to a fractional distillation or otherwise stopping the reaction and recovering the product. The longer the reaction is allowed to proceed, the higher will be the yield of the desired product. In practice, one skilled in organosilicon chemistry can easily select the reaction time which provides the best balance of overall yield of product within a reasonable time. In general, it is desirable to obtain as complete reaction as possible, particularly when preparing high molecular weight siloxane polymers.

The reaction between the silylamine and the hydroxy-silicon compound in the process of this invention can be accelerated by the use of a small amount of acidic catalyst such as an amine hydrohalide or an aluminum trihalide. Usually, however, the aluminum halide or amine hydrohalide is an undesirable contaminant in the reaction mixture and can interfere with the recovery of the desired product. It is therefore generally undesirable to use a catalyst in the process of this invention since the reaction ordinarily takes place at a convenient rate without a catalyst. In those instances where a cyclic siloxane product is desired and the reaction is carried out with a relatively high concentration of solvent, the rate of reaction may be reduced to such an extent that the use of a catalyst becomes desirable. Examples of suitable catalysts are aluminum trichloride, aluminum tribromide, diethylamine hydrochloride, dibutylamine hydroiodide, and piperidine hydrochloride. The amount of catalyst can vary from as little as 0.1 weight percent to five weight percent or greater based on the amount of silylamine employed.

The reaction is ordinarily carried out at atmospheric pressure, although pressures above or below atmospheric can be employed. When superatmospheric pressures are used, the reaction is conveniently carried out in a suitable pressure vessel such as a stainless steel autoclave. No particular advantages are derived from the use of reduced pressures or superatmospheric pressures.

It is preferable to carry out the process of this invention under anhydrous conditions. Any water present competes with the hydroxy-silicon compound in reacting with the silylamine. Also, if desired, the reaction can be carried out under an atmosphere of inert gas such as nitrogen, helium or argon.

The process of this invention is particularly advantageous because it proceeds at a convenient rate under relatively mild reaction conditions. Thus, high yields of the desired products can be obtained and undesirable side reactions are reduced to a minimum. Two side reactions which are particularly avoided by the process of this invention are (a) the self-condensation of a silylamine to form a silazane and ammonia, and (b) the self-condensation of hydroxy-silicon compounds with the formation of water and a siloxane by-product. It was entirely unexpected that the use of N-alkyl substituted silylamines of the class described with reference to Formulas 2 and 3 hereinabove would provide these advantages. Silylamines which do not have at least one alkyl substituent on the nitrogen atom self-condense at an extremely high rate and, even in the presence of hydroxy-silicon compounds, the primary reaction of an unsubstituted silylamine is the self-condensation reaction. On the other hand, silylamines containing three silicon-nitrogen bonds (that is, trifunctional silylamines) react so slowly with compounds containing silicon-bonded hydroxyl groups that this reaction is impractical for the production of organosilicon compounds.

Another advantage of the process of this invention is that siloxanes can be prepared wherein the organic groups attached to silicon can be regularly spaced along the polysiloxane chain. Such polysiloxanes can be produced because the process of this invention does not cause rearrangement of silicon-oxygen-silicon bonds. For example, the reaction, according to the process of this invention, of hexamethyltrisiloxane-1,5-diol with

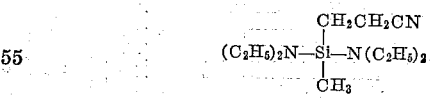

produces a modified dimethylpolysiloxane gum wherein every fourth silicon atom has one beta-cyanoethyl substituent. This regular spacing of organic groups cannot be obtained by conventional methods of equilibrating linear or cyclic siloxanes because of the random nature of such equilibration reactions and rearrangements of Si—O—Si bonds which can take place in the presence of conventional equilibration catalysts.

The organosilicon compounds prepared by the process of this invention have uses well understood in the art of organosilicon chemistry. For example, cyclic siloxanes containing dimethyl- and diphenylsiloxane units are readily polymerized to polysiloxane gums which are suitable for compounding into elastomers which have excellent flexibility at low temperatures. Also, the linear organopolysiloxanes prepared by the process of this invention are useful constituents in automobile polish and grease applications. The modified dimethylpolysiloxane gums having beta-cyanoethyl substituents can be compounds into cured elastomers which have excellent resistance to hydrocarbon solvents.

The following examples are presented. In the examples, "$n_D^{25}$" represents the refractive index at 25° C. with reference to the sodium D-line.

EXAMPLE 1

This example illustrates the advantages of the process of this invention which accrue because of our discovery that the silylamines of Formulas 2 and 3 above react with hydroxy-containing silicon compounds at a much faster rate than do other compounds containing silicon-nitrogen bonds.

Since ammonia or an amine is liberated when a compound containing a silicon-nitrogen bond reacts with a silanol, the rate of reaction can be followed by measurement of the rate of formation of ammonia or the amine. The procedure is as follows:

In a 30-milliliter Pyrex flask fitted with an inlet tube extending to the bottom of the flask and a reflux condenser there was placed 20 milliliters of bis(2-methoxyethyl)ether, and the silanol compound was dissolved in the ether. The flask was connected through the top of the condenser to a 125-milliliter Erlenmeyer flask containing 20 milliliters of freshly prepared aqueous solution of 2 weight percent boric acid. After immersing the flask in a constant temperature bath, dry nitrogen was passed through the inlet tube at a constant rate so as to sweep the exit gases through the boric acid solution. The compound containing a silicon-nitrogen bond was then added to the reaction flask and the amount of ammonia or amine generated during the reaction was measured by titrating the boric acid-amine complex with standard hydrochloric acid solution at timed intervals. The relative rates of reaction were then calculated by conventional methods. Typical results are summarized in Table I.

*Table I*

RELATIVE RATES OF REACTION OF SILICON-NITROGEN COMPOUNDS WITH DIPHENYLSILANEDIOL AT 50° C. IN BIS(2-METHOXYETHYL)ETHER

| Experiment | Silicon-Nitrogen Compound | Concentration (mole/liter) | | Percent Conversion in 3 Hours [1] |
|---|---|---|---|---|
| | | Diol | Silicon-Nitrogen Compound | |
| (a) | $(CH_3)_3SiN(C_2H_5)_2$ | .237 | .389 | 62 |
| (b) | $(CH_3)_3SiN(C_2H_5)_2$ | .223 | .49 | 59 |
| (c) | $(CH_3)_3SiNH(n-C_4H_9)$ | .237 | .482 | 34 |
| (d) | $(CH_3)_2Si[N(C_2H_5)_2]_2$ | .233 | .482 | 42 |
| (e) | $(CH_3)_2Si[NH(t-C_4H_9)]_2$ | .231 | .238 | 52 |
| (f) | $(CH_3)_3SiNHSi(CH_3)_3$ | .240 | .483 | 15 |
| (g) | $(CH_3)_3SiN(CH_3)Si(CH_3)_3$ | .235 | .468 | 17 |
| (h) | $ClSi[N(C_2H_5)_2]_3$ | .23 | .232 | 2 |
| (i) | $(C_2H_5)_3SiNH_2$ | | .182 | [2] >80 |

[1] Percent conversion = Total Millimoles of Amine Formed ×100 / Total Millimoles of Silicon-Nitorgen Compound
[2] Self-condensation of silylamine to silazane and ammonia.

It is apparent from Table I that the silylamines of experiments (a) through (e) react at relatively high rates with diphenylsilanediol and give a relatively high conversion to the desired product. On the other hand, the silazanes of experiments (f) and (g) and the trifunctional silylamine of experiment (h) react at relatively very slow and unsatisfactory rates. The unsubstituted silylamine of experiment (i) undergoes a self-condensation reaction at an extremely high rate, and this self-condensation reaction takes place almost as fast in the presence of diphenylsilanediol.

After reactions such as the above have proceeded to the desired degree of conversion, the reaction products can be recovered by fractional distillation or other convenient means. In the examples which follow, several recovery procedures are illustrated.

EXAMPLE 2

Using the general procedure outlined in Example 1, diphenylsilanediol (0.997 gram, 0.0046 mole) was dissolved in 20 milliliters of bis(2-methoxyethyl)ether. The constant temperature bath was maintained at 50° C. Bis(t-butylamino)dimethylsilane (0.853 gram, 0.0047 mole) was added and the mixture was maintained at the bath temperature over a period of forty minutes. The solvent was removed from the reaction mixture by evaporation at 50° C. under reduced pressure (5.0 millimeters) to yield 0.716 gram of viscous polysiloxane containing the repeating unit $$[-Si(C_6H_5)_2OSi(CH_3)_2O-]$$

and having $n_D^{25}=1.5540$.

EXAMPLE 3

Following the general procedure outlined in Example 1, triphenylsilanol (0.99 gram, 0.0037 mole) was dissolved in bis(2-methoxyethyl)ether (20 milliliters). N,N-diethylaminotrimethylsilane (0.53 gram, 0.0036 mole) was then added and the mixture was maintained at 50° C. over a period of 1350 minutes. The final reaction mixture was maintained at room temperature until the product, $(C_6H_5)_3SiOSi(CH_3)_3$, crystallized. The colorless crystals, 0.75 gram, had a melting point of 49° C. to 50° C. The melting point reported in Journal of the American Chemical Society, 74, 386 (1952) is 49.5° C. to 51.0° C.

EXAMPLE 4

Following the general procedure outlined in Example 1, hexamethyltrisiloxane-1,5-diol (1.04 grams, 0.0043 mole) was dissolved in freshly distilled xylene (20 milliliters). N,N - diethylaminotrimethylsilane (1.24 grams, 0.0086 mole) was then added and the mixture was maintained at a temperature of 50° C. over a period of 1443 minutes. The solvent was then removed by distillation at atmospheric pressure through a semi-micro column. The first fraction, 1.6 grams, boiling point 100° C. to 136° C., was tested for the presence of Si; the results were negative. The infrared spectrum of this fraction showed strong bands for xylene; the presence of $[(CH_3)_2SiO]_3$ was not detected. This result demonstrates that intramolecular condensation of the hexamethyltrisiloxane-1,5-diol did not occur with the formation of dimethylsiloxane cyclic trimer.

The liquid residue remaining after removal of the xylene solvent was then fractionally distilled under reduced pressure. The product, $(CH_3)_3SiO[Si(CH_3)_2O]_3Si(CH_3)_3$, 1.2 grams, had a boiling point of 123° C. to 133° C. (13 millimeters) and $n_D^{26.5}=1.3931$.

No liquid residue remained after the above fractionation. This demonstrates that intramolecular condensation of the diol did not occur since no high molecular weight polymer was formed.

EXAMPLE 5

Using a similar procedure to that described in Example 1, an hydroxy-end-blocked dimethylpolysiloxane fluid having the average formula $HO[Si(CH_3)_2O]_{20}H$ (5.0 grams) was dissolved in freshly distilled toluene (20 milliliters). N,N - diethylaminotrimethylsilane (1.38 grams, 0.0095 mole) was added and the mixture was maintained at 50° C. over a period of five hundred minutes. The solvent was evaporated at room temperature under reduced pressure (10 millimeters) to yield 4.5 grams of polysiloxane fluid having the average formula $$(CH_3)_3SiO[Si(CH_3)_2O]_{20}Si(CH_3)_3$$

EXAMPLE 6

Using a procedure similar to that described in Example 1, an hydroxy-end-blocked dimethylpolysiloxane fluid having the average formula $HO[Si(CH_3)_2O]_{20}H$ (5.0 grams) was dissolved in freshly distilled toluene (20 milliliters). Bis(N,N - diethylamino)dimethylsilane (1.32 grams, 0.0065 mole) was then added and the mixture was maintained at 50° C. over a period of 1605 minutes. The solvent was evaporated at room temperature under reduced pressure (10 millimeters) for five hours to yield 5.5 grams of a viscous polysiloxane containing the repeating unit [—Si(CH$_3$)$_2$O—] and having an average molecular weight greater than 3000.

EXAMPLE 7

Following the procedures of Example 1, the following additional examples of the process of this invention were carried out:

hours. The mixture was cooled, filtered free of the precipitated diethylamine hydrochlhoride and the residue was fractionally distilled. There was obtained 70 grams (51 mole percent) of the cyclic siloxane $$([C_6H_5]_2SiO][(CH_3)_2SiO]_3)$$

boiling point 120° C. to 130° C./0.25 millimeter, $n_D^{25}=1.4890$.

*Analysis.*—Calc. for C$_{18}$H$_{28}$Si$_4$O$_4$: C, 51.4; H, 6.7; Si, 26.6, M.W.=421. Found: C, 49.6; H, 6.3; Si, 25.9, M.W.=409.

| Reactants | Solvent | Temperature, ° C. | Product |
|---|---|---|---|
| (a) (C$_6$H$_5$)$_3$SiOH and (CH$_3$)$_3$SiN(C$_2$H$_5$)$_2$ | Bis(2-methoxyethyl)ether | 40 | (C$_6$H$_5$)$_3$SiOSi(CH$_3$)$_3$ |
| (b) (C$_6$H$_5$)$_3$SiOH and (CH$_3$)$_3$SiNH(t-C$_4$H$_9$) | Bis(2-methoxyethyl)ether | 50 | (C$_6$H$_5$)$_3$SiOSi(CH$_3$)$_3$ |
| (c) (C$_6$H$_5$)$_3$SiOH and (C$_2$H$_5$)$_3$SiNH(C$_2$H$_5$) | Quinoline | 50 | (C$_6$H$_5$)$_3$SiOSi(C$_2$H$_5$)$_3$ |
| (d) (C$_6$H$_5$)$_2$Si(OH)$_2$ and (CH$_3$)$_3$SiN(C$_2$H$_5$)$_2$ | Bis(2-methoxyethyl)ether | 30 | (CH$_3$)$_3$SiOSi(C$_6$H$_5$)$_2$OSi(CH$_3$)$_3$ (with C$_6$H$_5$ substituents) |
| (e) HO[Si(CH$_3$)$_2$O]$_3$H and (CH$_3$)$_3$SiN(C$_2$H$_5$)$_2$ | Dioxane | 50 | (CH$_3$)$_3$SiO(Si(CH$_3$)O)$_3$Si(CH$_3$)$_3$ |

EXAMPLE 8

To a one-liter Pyrex flask equipped with dropping funnel, stirrer, thermometer and Vigreaux column were added N,N-diethylaminotrimethylsilane (0.5 mole, 73 grams) and 100 milliliters of ethylene glycol dimethyl ether. A solution of diphenylsilanediol (0.23 mole, 50.5 grams) in 150 milliliters of ethylene glycol dimethyl ether was added dropwise to the silylamine over a period of twenty-five minutes. During this addition the temperature rose from 25° C. to 40° C. Stirring was maintained for one hour and then the reaction mixture was fractionally distilled. The yield of distilled $$(CH_3)_3SiOSi(C_6H_5)_2OSi(CH_3)_3$$

boiling point 102° C. to 103° C./0.2 millimeters, $n_D^{25}=1.4913$, was 63 grams, or 77 mole percent based on the diphenylsilanediol.

*Analysis.*—Calc. for C$_{18}$H$_{28}$Si$_3$O$_2$: C, 60.0; H, 7.8; Si, 23.4. Found: C, 61.1; H, 8.0; Si, 22.6 (OH nil).

EXAMPLE 9

Following the procedures of Example 8, a solution of (CH$_3$)$_3$SiOH in ethylene glycol dimethyl ether is added dropwise, with stirring, to a solution of $$(C_2H_5)_2NSi(CH_3)_2OSi(CH_3)_2OSi(CH_3)_2N(C_2H_5)_2$$

in ethylene glycol dimethyl ether at ambient temperature. The final mixture is stirred and then fractionally distilled to yield a siloxane having the average formula $$(CH_3)_3SiO[Si(CH_3)_2O]_3Si(CH_3)_3$$

EXAMPLE 10

To a one-liter, three-necked Pyrex flask equipped with a fritted glass bubbling tube and a magnetic stirrer was added a solution of 81 grams of (C$_6$H$_5$)$_2$Si[N(C$_2$H$_5$)$_2$]$_2$ (0.25 mole) containing a trace amount (less than one weight percent) diethylamine hydrochloride in 300 milliliters of xylene. A vigorous stream of nitrogen was passed through the mixture as a solution of 60 grams (0.25 mole) of HO[(CH$_3$)$_2$SiO]$_3$H in 300 milliliters of xylene was added over a period of two hours at ambient temperature. The mixture was stirred with nitrogen passing through the solution for an additional twenty hours and it was then transferred to a 50° C. bath and dry nitrogen was passed through the solution for another seventy-two

What is claimed is:
1. The process which comprises mixing together (1) an organosilicon compound represented by the formula

$$Y(\underset{R}{\overset{R}{Si}}O)_nH$$

wherein R contains from one to about ten carbon atoms and is selected from the class consisting of unsubstituted monovalent hydrocarbon groups and substituted monovalent hydrocarbon groups having substituents selected from the class consisting of halogen atoms, nitro, cyano, alkoxy and aryloxy groups, Y is selected from the class consisting of hydroxyl groups and R groups, and $n$ is an integer having a value from 1 to 50, and (2) an N-alkyl substituted silylamine represented by the formula $$Z\underset{R}{\overset{R}{Si}}NGG'$$

wherein G is an alkyl group containing from one to about ten carbon atoms, G' is selected from the class consisting of hydrogen and alkyl groups containing from one to about ten carbon atoms, Z is selected from the class consisting of —NGG', R, $$-(O\underset{R}{\overset{R}{Si}})_mNGG'$$

and $$-(O\underset{R}{\overset{R}{Si}})_mR$$

groups, $m$ is an integer having a value from 1 to 50, and R has the meaning defined hereinabove, and maintaining said mixture at a temperature between about 0° C. and about 200° C. to produce a siloxane comprising (A) at least one unit selected from the class represented by the formulas $$-R(\underset{R}{\overset{R}{Si}}-O)_n$$

and $$-O(\underset{R}{\overset{R}{\underset{|}{Si}}}-O)_n$$

where R and n have the meanings defined hereinabove and (B) at least one unit selected from the class represented by the formulas $$R\underset{R}{\overset{R}{\underset{|}{Si}}}-, \quad -\underset{R}{\overset{R}{\underset{|}{Si}}}-, \quad R(SiO)_m\underset{R}{\overset{R}{\underset{|}{Si}}}-$$

and $$-(\underset{R}{\overset{R}{\underset{|}{SiO}}})_m\underset{R}{\overset{R}{\underset{|}{Si}}}-$$

where R and m have the meanings defined hereinabove, said units (A) and (B) being interconnected by silicon-oxygen-silicon bonds.

2. The process which comprises mixing together (1) an organosilicon compound represented by the formula $$Y(\underset{R}{\overset{R}{\underset{|}{SiO}}})_nH$$

wherein R is a monovalent hydrocarbon group containing from one to about ten carbon atoms, Y is selected from the class consisting of hydroxyl groups and R groups, and n is an integer having a value from 1 to 50, and (2) an N-alkyl substituted silylamine represented by the formula $$Z\underset{R}{\overset{R}{\underset{|}{Si}}}NGG'$$

wherein G is an alkyl group containing from one to about ten carbon atoms, G' is selected from the class consisting of hydrogen and alkyl groups containing from one to about ten carbon atoms, Z is selected from the class consisting of —NGG', R, $$-(O\underset{R}{\overset{R}{\underset{|}{Si}}})_mNGG'$$

and $$(O\underset{R}{\overset{R}{\underset{|}{Si}}})_mR$$

groups, m is an integer having a value from 1 to 50, and R has the meaning defined hereinabove, and maintaining said mixture at a temperature between about 0° C. and about 200° C. to produce a siloxane comprising (A) at least one unit selected from the class represented by the formulas $$R(\underset{R}{\overset{R}{\underset{|}{Si}}}-O)_n$$

and $$-O(\underset{R}{\overset{R}{\underset{|}{Si}}}-O)_n$$

where R and n have the meanings defined hereinabove and (B) at least one unit selected from the class represented by the formulas $$R\underset{R}{\overset{R}{\underset{|}{Si}}}-, \quad -\underset{R}{\overset{R}{\underset{|}{Si}}}-, \quad R(SiO)_m\underset{R}{\overset{R}{\underset{|}{Si}}}-$$

and $$-(\underset{R}{\overset{R}{\underset{|}{SiO}}})_m\underset{R}{\overset{R}{\underset{|}{Si}}}-$$

where R and m have the meanings defined hereinabove, said units (A) and (B) being interconnected by silicon-oxygen-silicon bonds.

3. The process in accordance with claim 2 wherein said silylamine and said organosilicon compound are mixed together in a solvent selected from the class consisting of ethers, aromatic hydrocarbons and aliphatic hydrocarbons.

4. The process in accordance with claim 2 wherein said mixture of silylamine and organosilicon compound is maintained at a temperature between about 20° C. and about 100° C.

5. The process in accordance with claim 2 wherein said mixture contains a catalyst selected from the class consisting of aluminum trihalides and amine hydrohalides.

6. The process which comprises mixing together (1) an organisilicon compound represented by the formula $$Y(\underset{R}{\overset{R}{\underset{|}{SiO}}})_nH$$

wherein R is a monovalent hydrocarbon group containing from one to about ten carbon atoms, Y is selected from the class consisting of hydroxyl groups and R groups and n is an integer having a value from 1 to 50, and (2) an N-alkyl substituted silylamine represented by the formula $R_2Si(NGG')_2$ wherein R has the meaning defined hereinabove, G is an alkyl group containing from one to about ten carbon atoms, and G' is selected from the class consisting of hydrogen and alkyl groups containing from one to about ten carbon atoms, and maintaining said mixture at a temperature between about 0° C. and about 200° C. to produce a siloxane comprising (A) at least one unit selected from the class represented by the formulas $$R(\underset{R}{\overset{R}{\underset{|}{Si}}}-O)_n$$

and $$-O(\underset{R}{\overset{R}{\underset{|}{Si}}}-O)_n$$

where R and n have the meanings defined hereinabove and (B) at least one unit represented by the formula $$-\underset{R}{\overset{R}{\underset{|}{Si}}}-$$

where R has the meaning defined hereinabove, said units (A) and (B) being interconnected by silicon-oxygen-silicon bonds.

7. The process which comprises mixing together in ethylene glycol dimethyl ether solvent N,N-diethylaminotrimethylsilane and diphenylsilanediol and maintaining said mixture at a temperature between about 20° C. and about 100° C. until $(CH_3)_3SiOSi(C_6H_5)_2OSi(CH_3)_3$ is produced.

8. The process which comprises mixing together in toluene solvent bis(N,N-diethylamino)dimethylsilane and $HO[Si(CH_3)_2O]_{20}H$ and maintaining said mixture at a temperature between about 20° C. and about 100° C. until a polysiloxane containing the repeating structural unit $[—Si(CH_3)_2O—]$ and having an average molecular weight of at least 3000 is produced.

9. The process which comprises mixing together in xylene solvent N,N-diethylaminotrimethylsilane and hexamethyltrisiloxane-1,5-diol and maintaining said mixture at a temperature between about 20° C. and about 100° C. until $(CH_3)_3SiO[Si(CH_3)_2O]_3Si(CH_3)_3$ is produced.

10. The process which comprises mixing together in bis(2-methoxyethyl)ether solvent bis(t-butylamino)dimethylsilane and diphenylsilanediol and maintaining said mixture at a temperature between about 20° C. and about 100° C. until a polysiloxane containing the repeating structural unit [—Si(C$_6$H$_5$)$_2$OSi(CH$_3$)$_2$O—] is produced.

11. The process which comprises mixing together in xylene solvent bis(N,N-diethylamino)diphenylsilane and hexamethyltrisiloxane-1,5-diol and maintaining said mixture at a temperature between about 20° C. and about 100° C. until the cyclic siloxane ([Si(C$_6$H$_5$)$_2$O][Si(CH$_3$)$_2$O]$_3$)

is produced.

References Cited in the file of this patent

UNITED STATES PATENTS

| 2,676,163 | Speier | Apr. 20, 1954 |
| 2,876,209 | De Benneville et al. | Mar. 3, 1959 |
| 3,032,528 | Nitzsche et al. | May 1, 1962 |

FOREIGN PATENTS

| 1,248,826 | France | Nov. 14, 1960 |

OTHER REFERENCES

Smith: "Svensk. Kem. Tidsk.," vol. 65 (1953), pages 101–103 (48 Chem. Abstracts 9,907).

Pike: "Journal Organic Chemistry," volume 26 (January 1961), pages 232–236.

UNITED STATES PATENT OFFICE
CERTIFICATE OF CORRECTION

Patent No. 3,133,110            May 12, 1964

Edward L. Morehouse et al.

It is hereby certified that error appears in the above numbered patent requiring correction and that the said Letters Patent should read as corrected below.

Column 6, line 75, for "compounds" read -- compounded --; column 7, line 9, for "accure" read -- accrue --; line 58, for "Silicon-Nitorgen" read -- Silicon-Nitrogen --; column 10, line 2, for "hydrochlhoride" read -- hydrochloride --.

Signed and sealed this 29th day of September 1964.

(SEAL)
Attest:

ERNEST W. SWIDER
Attesting Officer

EDWARD J. BRENNER
Commissioner of Patents